PHASE MODULATED FREQUENCY DIVISION MULTIPLEX SYSTEM

Filed June 17, 1964

3 Sheets-Sheet 1

Inventor
S. ITO -
S. YOKOYAMA
By [signature]
Attorney

Inventor
S. ITO –
S. YOKOYAMA
By [signature]
Attorney

Inventor
S. ITO -
S. YOKOYAMA
By [signature]
Attorney

United States Patent Office 3,349,182
Patented Oct. 24, 1967

3,349,182

PHASE-MODULATED FREQUENCY DIVISION MULTIPLEX SYSTEM

Sukehiro Ito and Seijiro Yokoyama, Tokyo, Japan, assignors to Nippon Electric Company, Limited, Tokyo, Japan, a corporation of Japan Filed June 17, 1964, Ser. No. 375,766
Claims priority, application Japan, June 28, 1963, 38/33,792
14 Claims. (Cl. 179—15)

This invention relates to a phase-modulation transmitter which transmits through a single transmission path frequency-division multiplexed signals or a plurality of digital signal series (such as telegraph signals) as may be derived by phase modulating the respective carrier waves of a plurality of channels with such signal series. The technical merits of this invention are enhanced when used in conjunction with a phase-demodulation receiver described in a copending application entitled "A Rectangular-Code Regenerator," filed on July 29, 1964, Ser. No. 384,493 by applicants and assigned to the same assignee and corresponding to Japanese patent application No. 39,987 of 1963 (Sukehiro Ito and Seijiro Yokoyama 11–2) filed on July 29, 1963.

An object of the invention is to provide a phase-modulation transmitter which is best adapted for use on the transmitter side of a communication system comprising the above-mentioned receiver disclosed in said copending application.

Another object of the invention is to provide a phase-modulation transmitter of the kind, wherein it is unnecessary (notwithstanding the frequency division multiplexing employed) to provide on the transmitter side any filters for the respective channels and yet narrow the spacing between the channel frequencies to the theoretically possible minimum value and thus ensure effective utilization of the frequency band.

According to the invention a phase-modulation transmitter is provided which transmits a number of series of frequency-divided information signals. The transmitter includes: a plurality of input terminals for receiving said information signal series; a reference oscillator for producing an electrical oscillation having a reference frequency which determines the transmission speed; signal conversion means connected to said input terminals and said reference oscillator for converting said information signal series into a plurality of code trains corresponding to the respective ones of said information signal series. Each of said trains comprises an elementary code whose time duration is equal to the reciprocal of said frequency and is synchronized in phase with said oscillation. The transmitter also includes a subcarrier producing means connected to said reference oscillator for transforming said electrical oscillation into a plurality of subcarriers which are spaced in frequency from one another by said reference frequency; phase-modulating means connected to said signal conversion means and said subcarrier producing means for phase-modulating said subcarriers by code-train combinations, each of which comprises at least one of said code trains; a local oscillator for generating a carrier-frequency electrical oscillation; and frequency conversion means connected to said phase-modulating means and said local oscillator for frequency-converting the phase-modulated subcarriers by said carrier-frequency electrical oscillation.

It has hitherto been necessary (in order to perform frequency-division multiplexing) to use on the transmitter side, a band-pass filter for each channel in order to prevent energy from each channel intruding into another channel to cause interference. "N" filters were required for an $n$-channel multiplexed line. These filters have very substantial drawbacks such as bulkiness and high cost. Additionally, they have intrinsic drawbacks. For example, the filter has essentially linear amplitude and phase characteristics only in the neighborhood of the center frequency of the filter. On either side of the center frequency they have very considerable non-linear amplitude and phase characteristics which may introduce distortions into the waveforms of the telegraph and other digital signals and thus may cause crosstalk among the codes. However, if the transmission band is restricted only to the band of excellent linear amplitude and phase characteristics to get rid of the crosstalk then the spacing between the adjacent channel frequencies must be considerably broader than the theoretically required minimum. Thus, it has been impossible to attain (when filters are used to separate the channels from one another) the transmission speed of 2B bits per second which is the theoretically possible maximum speed in each channel of a multiplexed code-transmission line of $n$ channels spaced by a frequency difference of B cycles. To date it has been possible to realize generally only about forty percent of this theoretically maximum speed. Moreover, even when complicated filters and phase compensators are manufactured with great effort and care, only about eighty percent of said theoretical speed at best is attainable. This is quite a loss from the viewpoint of utilization of frequency bands.

If a phase-modulating transmitter of this invention is used in conjunction with a rectangular-code regenerator disclosed in the aforementioned copending application then no filters are required for the respective channels on the transmitter side. Thus it has become possible to eliminate all the drawbacks of the conventional systems and to realize highly efficient multiplexed code-transmission lines.

The above-mentioned and other features and objects of this invention and the means of attaining them will become more apparent and the invention itself will be best understood by reference to the following description of embodiments of the invention taken in conjunction with the accompanying drawings in which.

Figures 1, 2:
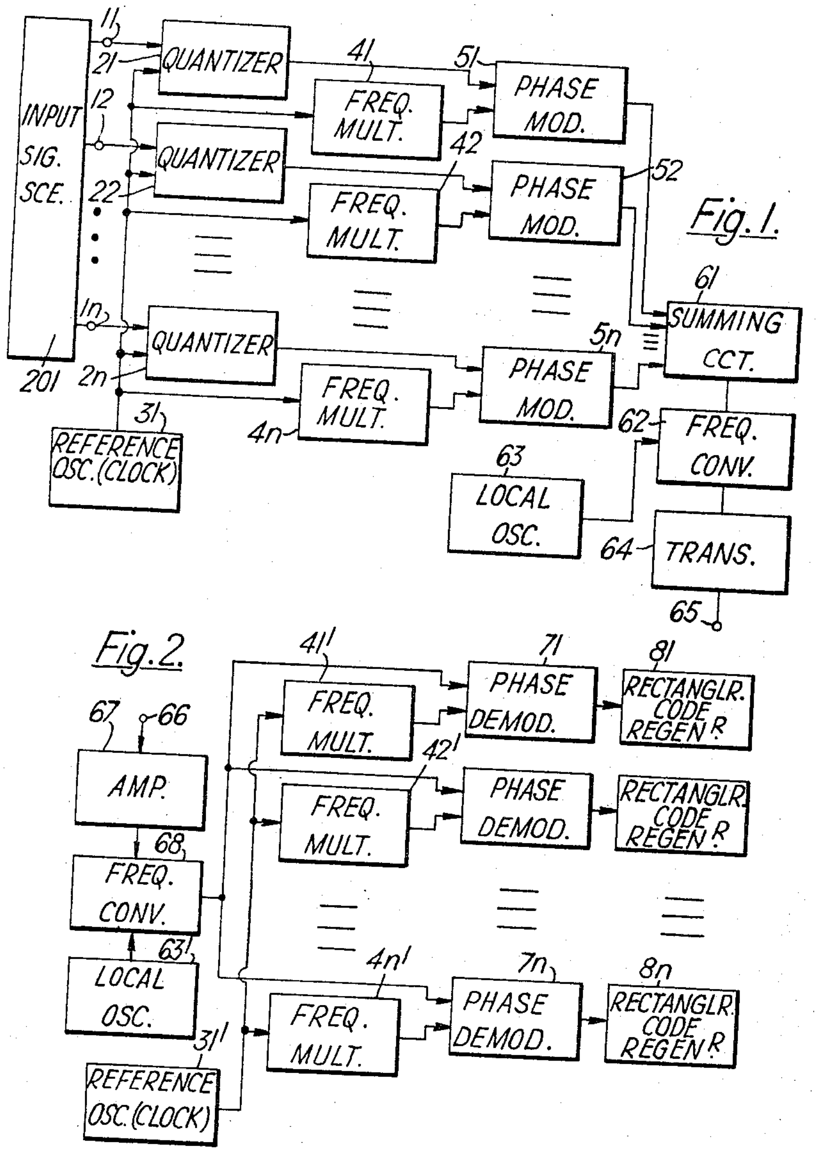
FIG. 1 is a block diagram of an embodiment of the invention wherein two-phase phase-modulation is effected.
FIG. 2 is a block diagram of an example of a receiver for receiving the waves transmitted from the transmitter embodiment of FIG. 1.
Figure 3:
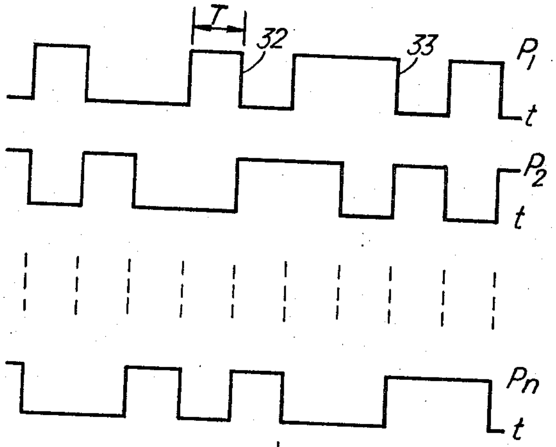
FIG. 3 shows binary code series waveforms ($n$ in number) for the embodiment.
Figure 4:
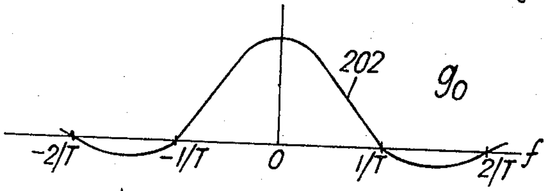
FIG. 4 shows the frequency spectrum waveforms of one of these binary code series.
Figure 5:
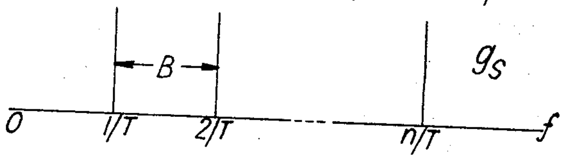
FIG. 5 shows the spectra of subcarriers.

Reference will first be made to FIGS. 1 and 3. A phase modulation transmitter of the invention is shown in FIG. 1 in which $n$ subcarriers are phase-reversed modulated (or two-phase-modulated) with one of $n$ respective rectangular binary-code series $Pk$ ($k=1, 2, \ldots, n$). The $n$ phase reversal subcarriers, are frequency-converted to the carrier frequency. More particularly, $n$ independent information signal series are supplied to $n$ input terminals 11, 12 . . . , and 1$n$, respectively, from input signal source 201 and are transformed by quantizing and encoding devices 21, 22 . . . , 2$n$ (hereafter called information quantizing devices) into $n$ rectangular binary-code trains $P_k$, respectively. Each code train comprises as an elementary code, a rectangular pulse of a time duration T corresponding to the transmission speed $1/T$ for the two-phase modulation being considered. The information quantizing devices 21, 22 etc. are supplied with a substantially sinusoidal timing wave (having a clock frequency B which is equal to the transmission speed $1/T$ from a reference oscillator 31 which will hereafter be named a clock frequency generator. The quantizer 21, 22 etc. produce the $n$ rectangular binary-code trains $P_k$, which are phase-synchronized with one another as shown in FIG. 3. The elementary code contained in these code trains assumes one of two values $a$ and $-a$ independently of other preceding and succeeding elementary codes. In such a code train, matters which are true as to an arbitrary one of the elementary codes are also true for all other elementary codes. It is therefore possible (instead of considering a code train as a whole) to take only an arbitrary one of the elementary codes into consideration. Thus, for one of the elementary codes in a code train $P_k$, if the time origin is taken at the midpoint of the elementary code sample under consideration, then the elementary code is given by a set of expressions:

$$\begin{matrix} [a] & -T/2 \leqq T/2 \leqq T/2 \\ 0 & t < -T/2 \text{ and } T/2 < t \end{matrix} \quad (1)$$

where $[\alpha]$ represents either $+\alpha$ or $-\alpha$. The frequency spectrum $g_0$ of the elementary code is therefore given, from calculation of the Fourier integral of $[a]$, by $$g_0 = [a] \cdot T \sin \pi Tf/(\pi Tf) \quad (2)$$

and is illustrated as curve 202 in FIG. 4. Returning to FIG. 1, the sinusoidal wave (having the frequency B) from the clock frequency generator 31 is also delivered to all of the $n$ frequency multipliers 41, 42, . . . , and 4n. The frequency multiplication factors of these multipliers are related by a factor K (where $k=1, 2, \ldots, n$) respectively. When the amplitude of the frequency-multiplied outputs are made equal to one another, the outputs of the frequency multipliers 41, 42, . . . , and 4n are substantially sinusoidal waves of frequencies $kB$ ($k=1, 2, \ldots, n$) whose spectra $g_s$ may be illustrated by $n$ line spectra, spaced by a frequency interval of B as illustrated in FIG. 5. These subcarriers are two-phase phase modulated (at phase-reversal) at the $n$ phase modulators 51, 52, . . . , and 5n, by the corresponding rectangular binary-code trains $P_k$, respectively. The subcarriers of the frequencies $k$B may be expressed by $$A \cos 2\pi kBt$$

where A is the common amplitude of the subcarriers. Inasmuch as the phase of a subcarrier remains unchanged when a code train $P_k$ assumes the value of $a$ and undergoes a phase shift of 180 degrees when the code train $P_k$ assumes the value of $-a$, the $M^{th}$ subcarrier phase-modulated by the code train $P_k$ may be expressed by $$\begin{matrix} M = A \cos [2\pi kBt + (a - P_k)\pi/(2a)] \\ M = \pm A \cos 2\pi kBt \end{matrix} \quad (3)$$

where $+$ and $-$ correspond to $P_k=a$ and $P_k=-a$, respectively. In a manner similar to the set of Equations 1 above for an elementary code, the state of the modulated wave M may be given by $$\begin{matrix} [A] \cos 2\pi kBt & -T/2 \leqq t \leqq T/2 \\ 0 & t < -T/2 \text{ and } T/2 < t \end{matrix} \quad (4)$$

where [A] represents either of +A and −A. Therefore, the spectra, or more particularly the Fourier integrals of Expressions 3, are given by $$g_k = [A] T \cdot sin\ (f-kB)\pi T/(f-kB)[\pi T] \quad (5)$$

Figure 6:
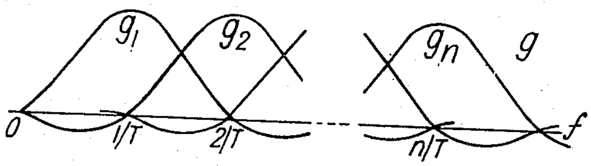
FIG. 6 shows the spectra of the phase-modulated subcarriers.
Figure 7:
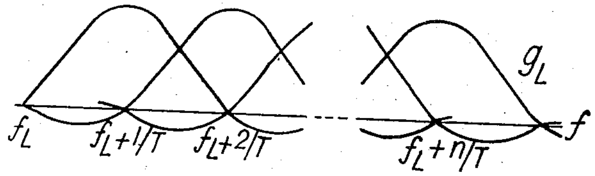
FIG. 7 shows the spectrum of the phase-modulated wave at the carrier-frequency band.

The spectrum $g$ of the sum of the phase-modulated waves supplied to the composing (adding) circuit 61 is given by $$g = \sum_{k=1}^{n} gk = \sum_{k=1}^{n} [A] T.\sin\ (f-kB)\pi T/[(f-kB)\pi T] \quad (6)$$

and is illustrated in FIG. 6. Referring again to FIG. 1, the phase modulated wave obtained at the output of circuit 61 is frequency-converted at frequency converter 62 (by the output of a fixed frequency $f_L$ of a local oscillator 63) up to the carrier frequency band whose spectrum $g_L$ is shown in FIG. 7. The frequency-converted wave is now sent out through an output terminal 65 of a transmitter 64.

In the above, explanation has been made of the construction and the operation of a modulator of the invention. A brief description will now be made of the construction and operation of a receiver for phase-demodulating the thus transmitted modulated waves. The receiver includes the rectangular code regenerator disclosed in our above-mentioned copending application and a complete and detailed analysis thereof is given in said copending application.

Referring to FIG. 2, there is illustrated therein a receiver disclosed in our said copending application. In this receiver the modulated wave transmitted through, for example, a transmission line (not shown) is received at an input terminal 66. The received wave is then amplified at a carrier-frequency amplifier 67 to a suitable level. The amplified wave is then converted at frequency converter 68 down to the subcarrier frequency band by being mixed with the output of a local oscillator 63′ whose oscillation frequency is the same as that of the local oscillator 63 on the transmitter side. The spectrum of the phase-modulated wave obtained at the output of the frequency converter 68 is the same as the spectrum $g$ shown in FIG. 6 and is to be interpreted as set forth heretofore. The phase-modulated wave is supplied to all of the $n$ phase demodulators 71, 72 . . . , and 7n. Meanwhile, the output frequency B of a reception clock frequency generator 31′ (which is in complete synchronism with the clock frequency generator 31 on the transmitter side of FIG. 1), is applied to all of the $n$ frequency multipliers 41′, 42′, . . . , and 4n′. These multipliers operate in a manner similar to the $n$ frequency multipliers 41 etc., of the transmitter shown in FIG. 1, to derive outputs of frequencies B, 2B, . . . , and $n$B, respectively. These outputs are delivered to the $n$ phase demodulators 71, 72, etc., respectively, as local oscillations for phase demodulation. Consequently, the spectrum $S_{oh}$ of the output of any $h^{th}$ phase demodulator $7h$ (not specifically shown) among the $n$ phase demodulators, is given by $$S_{oh} = \sum_{k=1}^{n} [A] T \cdot \sin\ [f-(k-h)B]\pi T/[(f-(k-h))\pi T] \quad (7)$$

Equation 7 holds because the spectrum is obtained by translating the origin of the spectrum $g$ of the phase-modulated wave given by Equation 6 along the frequency axis by an amount equal to the frequency $h$B of the local oscillation for the phase demodulation. Blocks 81, 82, . . . , and 8n are the rectangular-code regenerators disclosed in complete details in our above-mentioned copending application. Each code regenerator comprises an integrator, a read-out device, and a shaper. Each has a characteristic of a matched filter whose transmission function is quite the same as the frequency spectrum $g_0$ of a binary-code train $P_k$ given by Equation 2 and shown in FIG. 4. The $h^{th}$ phase-demodulated output therefore becomes, after passing through the integrator and the read-out device of an $h^{th}$ rectangular-code regenerator 8h

(not specifically shown), a read-out output $P_{oh}$ which is given by the equation:

$$P_{oh}=\int_{-\infty}^{\infty} S_{oh}[T \sin \pi fT/(\pi fT)]df \qquad (8)$$

By substituting Equation 7 in Equation 8 we obtain:

$$P_{oh}=\int_{-\infty}^{\infty}\sum_{k=1}^{n}[A]T^2\cdot\left[\frac{\sin f-(k-h)B)\pi T}{[f-(k-h)\pi T]}\right]\cdot\left[\frac{\sin \pi fT}{\pi fT}\right]df \qquad (9)$$

By carrying out the integration indicated in Equation 9, we obtain:

$$P_{oh}=[A]T\sum_{k=1}^{n}\sin (k-h)B\pi T/[(k-h)B\pi T] \qquad (10)$$

It should be noted that the frequency spacing between the adjacent channels is equal to $1/T$, $BT=1$. Therefore, the read-out output $P_{oh}$ given by Equation 10 is given by $$P_{oh}=[A]T\sum_{k=1}^{n}\sin (k-h)\pi/[(k-h)\pi] \qquad (11)$$

Equation 11 becomes 0 when $k$ is not equal to $h$, and assumes the value of [A]T only when $k$ is equal to $h$. This shows that the read-out output $P_{oh}$ is the output derived from that one of the $n$ phase-demodulated outputs (which are supplied to the $h^{th}$ rectangular-code 8*h* and which correspond to the $n$ demodulated binary-code trains $P_k$, respectively) which corresponds only to a demodulated binary-code train $Ph$ where $k=h$ (and undergoes no interference of other demodulated binary-code trains, $n-1$ in number, where $k$ is not equal to $h$). The $n$ read-out outputs $P_{ok}$ ($k=1, 2, \ldots, n$), thus obtained are recovered at the respective shapers in blocks 81, 82 etc. in the form of the original $n$ binary-code trains, respectively.

Figure 8:
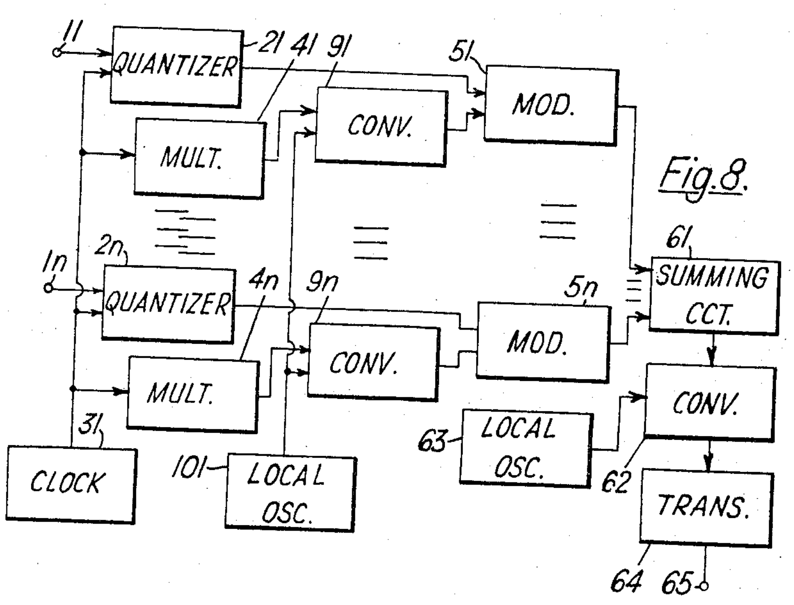
FIG. 8 is a block diagram of another embodiment of the invention.

Referring to FIG. 8, there is illustrated therein another embodiment of a transmitter according to the invention. In this embodiment the subcarriers are somewhat different from those in the embodiment of FIG. 1. In this embodiment, the outputs of the frequency multipliers 41, 42, . . . , and 4*n* are used as the subcarriers (not by themselves) but only after being frequency-converted at the $n$ frequency-converters, 91, 92, . . . , and 9*n*, by the output of a second local oscillator 101 of the fixed oscillation frequency $f_N$. The multiplier outputs are converted to frequencies $f_N+kB$ or $f_N-kB$ ($k=1, 2, \ldots, n$), respectively. This modification is made in consideration of the fact that it is often preferable to two-phase phase-modulate at the two-phase modulators 51, 52, etc. on subcarriers which have been frequency-converted to a frequency band convenient for the design and manufacture of the two-phase phase modulators.

Figure 9:
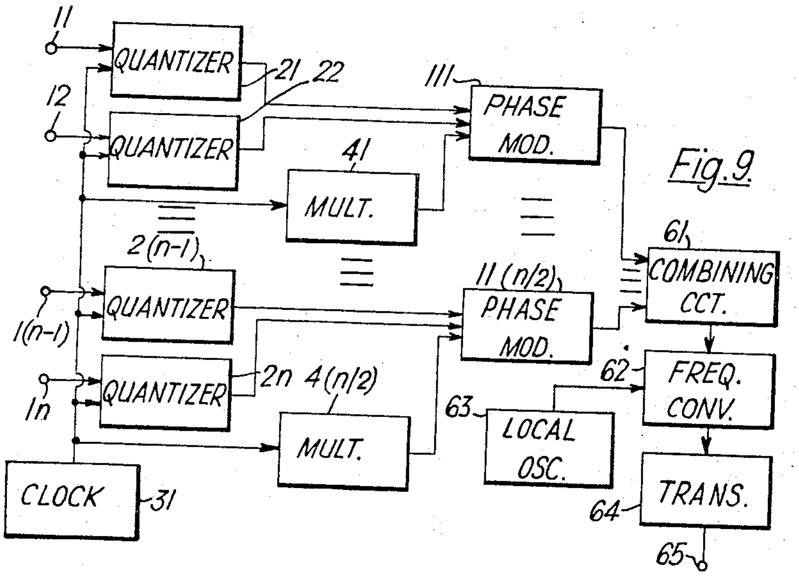
FIG. 9 is a block diagram of a further embodiment of the invention wherein four-phase phase-modulation is employed.

Referring to FIG. 9, there is illustrated therein a further embodiment of the invention wherein circuitry is simplified by using four-phase phase-modulation as compared with the former embodiments wherein two-phase phase modulation is employed. More particularly, $n$ information signal series are supplied to $n$ respectively input terminals 11, 12, etc. These information signals are converted by use of $n$ information quantizing devices 21, 22, etc. which are connected to a common clock frequency oscillator 31. The quantized devices and the clock 31 all are similar to those described heretofore in FIG. 1. The quantizer outputs are $n$ rectangular binary-code trains $P_k$, which consist of elementary codes of time duration T and are phase-synchronized as illustrated in FIG. 3. The output of the oscillator 31 is also supplied to all of frequency multipliers 41, 42, . . ., and 4($n/2$), $n/2$ in number, whose factors of frequency multiplication are $q$ ($q=1, 2, \ldots, n/2$). The outputs of the frequency multipliers 41 etc. are $n/2$ subcarriers, whose frequencies $q$B are spaced by a frequency B. These subcarriers are four-phase, phase modulated, respectively, at the $n/2$ four-phase phase modulators 111, 112, . . ., and 11($n/2$), by the rectangular binary-code trains paired by two into $n/2$ sets. The derived four-phase phase-modulated subcarriers are converted to the carrier frequency at a conventional heterodyne transmitter means comprising a combiner 61, a frequency converter 62, and a local oscillator 63 in the manner explained in conjunction with the embodiment of FIG. 1 and the transmitter 64. At the receiver the four-phase phase-modulated wave is synchronism-detected to drive the paired binary-code trains without any interference therebetween. In addition to the technical merits of the embodiment of FIG. 1, wherein two-phase phase modulation is employed, it will be appreciated that in the foregoing description of FIG. 9 (wherein the subcarriers are four-phase phase modulated by the respective pairs of the rectangular binary-code trains) only half of the frequency multipliers 41 etc. and similar components are required as compared with the case using two-phase phase modulation. This holds true also for the receiver. Incidentally, it is to be noted that while the explanation hereinabove has been made assuming the number $n$ to be an even number, the number of the subcarriers must be $(n+1)/2$ instead of $n/2$ if the number $n$ is an odd number.

Four-phase phase modulation can also be used in the case of the embodiment shown in FIG. 8 wherein the subcarriers are obtained by frequency-converting the outputs of the frequency multipliers 41, 42, etc. by the second local oscillator 101. The number of the frequency multiplier 41 etc. and the additional frequency converters 91 etc. may be half that required for the two-phase phase modulation. The same applies also to the receiver.

While we have described above the principles of our invention in connection with specific embodiments, it is to be clearly understood that this description is made only by way of example, and not as a limitation to the scope of our invention as set forth in the objects thereof and in the accompanying claims.

What is claimed is:

1. A phase modulation transmitter for transmitting frequency separated information signals comprising:

(A) an information signal source for providing more than one information output signal;

(B) conversion means connected to said information signal source for receiving said information signal and for converting each of said information signals into at least one corresponding code train at a predetermined rate of conversion;

(C) sub-carrier producing means for generating sub-carrier waves spaced in frequency from each other by an integral multiple of said predetermined conversion rate;

(D) phase modulating means connected to receive the outputs from said conversion means and said subcarrier producing means for phase modulating each of said subcarriers in accordance with the code contained in different code trains; and (E) means connected to said phase modulating means for transmitting the modulated subcarrier outputs thereof.

2. A phase modulated transmitter as set forth in claim 1 wherein the phase modulation means provides phase inversion modulation.

3. A phase modulated transmitter as set forth in claim 1 wherein frequency conversion means, including a carrier frequency signal source are provided and connected to said phase modulation means for modulating said carrier with said phase modulated signals; and wherein said transmitting means are connected to said frequency modulating means for transmitting the thus modulated carrier signal.

4. A phase modulated transmitter as set forth in claim 3 wherein the conversion means converts the information input signals into a binary code and wherein said phase modulating means modulates the subcarrier in accordance with said binary code.

5. A phase modulation transmitter as set forth in claim 3 wherein the subcarrier producing means comprises a reference signal source and a frequency multiplier connected thereto.

6. A phase modulated transmitter as set forth in claim 5 wherein the reference signal source is connected to supply reference signal to said conversion means to control the rate of conversion such that each element of each of said code trains has a duration equal to the reciprocal of said reference frequency and each element of each train is synchronized to be in phase with said reference frequency.

7. A phase modulated transmitter as set forth in claim 5 wherein the subcarrier producing means further includes a second converter and a local oscillator, the output of said frequency multiplier and said local oscillator being connected to said second converter for frequency converting said multiplied waves, the output of said second converter being connected to said phase modulating means.

8. A phase modulated transmitter as set forth in claim 1 wherein the conversion means converts the information input signals into a binary code and wherein said phase modulating means modulates the subcarrier in accordance with said binary code.

9. A phase modulation transmitter for transmitting multiplexed information signals comprising:

(A) an information input signal source providing a plurality of information signals;

(B) a reference signal source for generating reference signals;

(C) a channel for each one of said information signals, each channel including:

(1) an input terminal connected to said signal source, each input terminal receiving a different one of said information signals, (2) an output terminal, (3) conversion means connected to said input terminal and to said reference signal source for converting the input information signals into at least one corresponding code train, the frequency of said reference source controlling the rate of conversion of said input signals into said code trains, (4) subcarrier producing means connected to said reference signal source for generating at least one subcarrier frequency for said channel, which is an integral multiple of said reference frequency, (5) phase modulation means connected to receive the outputs of said conversion means and said subcarrier producing means for phase modulating said subcarrier in accordance with the code contained in at least one of said code trains;

(D) combining means connected to the output terminals of said channels for combining the output signals thereof;

(E) frequency conversion means, including a carrier frequency signal source, connected to said combining means for modulating said carrier signal, with the combined modulated signals; and (F) transmitting means connected to said frequency converting means for transmitting the output thereof.

10. A phase modulated transmitter as set forth in claim 9 wherein the conversion means converts the information input signals into a binary code and wherein said phase modulating means modulates the subcarrier in accordance with said binary code.

11. A phase modulation transmitter as set forth in claim 9 wherein the reference signal source is connected to supply reference signals to said conversion means to control the rate of conversion such that each element of each of said code trains has a duration equal to the reciprocal of said reference frequency and each element of each train is synchronized to be in phase with said reference frequency.

12. A phase modulation transmitter as set forth in claim 9 wherein said subcarrier producing means includes a frequency multiplier in each channel connected to said reference signal source.

13. A phase modulation transmitter as set forth in claim 12 wherein said subcarrier producing means further includes second frequency conversion means for each channel and a common local oscillator for all channels, the output of said frequency multiplier and said local oscillator being connected to said second conversion means for frequency converting said multiplied waves, the output of said second conversion means being connected to the phase modulating means in the channel.

14. A phase modulation transmitter as set forth in claim 9 for transmitting four-phase phase modulations wherein each channel is further provided with: a second input terminal for receiving a second input signal; second conversion means connected to said second input terminal, said second conversion means also being connected to said references signal source, said second conversion means converting the information signals supplied from said second input terminal into at least one corresponding code train; and wherein the output of said second conversion means is also connected to the phase modulation means in said channel, said phase modulating means modulating said subcarrier signals in accordance with at least one code train from each of said conversion means in said channel.

References Cited

UNITED STATES PATENTS 3,202,765 8/1965 Byrne ............ 179—15

JOHN W. CALDWELL, *Primary Examiner.*

R. L. GRIFFIN, *Assistant Examiner.*

UNITED STATES PATENT OFFICE
CERTIFICATE OF CORRECTION

Patent No. 3,349,182 October 24, 1967

Sukehiro Ito et al.

It is hereby certified that error appears in the above numbered patent requiring correction and that the said Letters Patent should read as corrected below.

Column 1, line 20, for "July 29, 1964" read -- July 22, 1964 --; column 3, line 5, after "two-phase" insert -- phase --; line 25, for "[a] $-T/2\leq T/2\leq T/2$" read -- [a] $-T/2\leq t\leq T/2$ --; line 32, for "$g_o=[a]\cdot T \sin\pi Tf/(\pi Tf)$" read -- $g_o=[a]\cdot T\cdot \sin\pi Tf/(\pi Tf)$ --; column 4, lines 4 and 5, the formula should appear as shown below instead of as in the patent:

$$g=\sum_{k=1}^{n} g_k=\sum_{k=1}^{n} [A]T.\sin(f-kB)\pi T/[(f-kB)\pi T]$$

Signed and sealed this 5th day of November 1968.

(SEAL)
Attest:

EDWARD M.FLETCHER,JR.
Attesting Officer

EDWARD J. BRENNER
Commissioner of Patents